United States Patent
Mogul

(10) Patent No.: US 7,315,884 B2
(45) Date of Patent: Jan. 1, 2008

(54) REDUCTION OF NETWORK RETRIEVAL LATENCY USING CACHE AND DIGEST

(75) Inventor: Jeffrey C. Mogul, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1224 days.

(21) Appl. No.: 09/825,661

(22) Filed: Apr. 3, 2001

(65) Prior Publication Data

US 2002/0143892 A1 Oct. 3, 2002

(51) Int. Cl.
G06F 15/16 (2006.01)

(52) U.S. Cl. ...................................... 709/217; 709/237

(58) Field of Classification Search ................ 709/202, 709/203, 217, 219, 237; 707/6, 203; 711/118, 711/216
See application file for complete search history.

(56) References Cited

U.S. PATENT DOCUMENTS

| | | | | |
|---|---|---|---|---|
| 5,301,280 | A * | 4/1994 | Schwartz et al. | 709/237 |
| 5,734,898 | A * | 3/1998 | He | 707/203 |
| 5,919,247 | A * | 7/1999 | Van Hoff et al. | 709/217 |
| 6,389,510 | B1 * | 5/2002 | Chen et al. | 711/113 |
| 2001/0027479 | A1 * | 10/2001 | Delaney et al. | 709/216 |
| 2002/0048269 | A1 * | 4/2002 | Hong et al. | 370/389 |
| 2002/0073276 | A1 * | 6/2002 | Howard et al. | 711/113 |

OTHER PUBLICATIONS http://www.webopedia.com/TERM/h/hashing.html, Jul. 12, 2004.*

W3 Consortium, "The HTTP Distribution and Replication Protocol," http://www.w3.org/TR/NOTE (Aug. 25, 1997).

Banga, Gaurav et al., "Optimistic Deltas for WWW Latency Reduction," Usenix—Abstract—1997 Annual Technical Conference. http://www.usenix.org/publications.

Mogul, Jeffrey C., "A trace-based analysis of duplicate suppression in HTTP," Western Research Laboratory—Compaq, Research Report 99/2, Nov. 1999.

Mogul, Jeffrey C., "Squeezing More Bits Out of HTTP Caches," IEEE Network, May/Jun. 2000.

Preneel, Bart et al., "The Cryptographic Hash Function RIPEMD-160," The Technical Newsletter of RSA Laboratories, Autumn 1997.

Rivest, R., "The MD5 Message-Digest Algorithm," http://rfc-fh.koeln.de/rfc/html/rfc1321.html, Apr. 1992.

Santos, Jonathan et al., "Increasing Effective Link Bandwidth by Suppressing Replicated Data," Abstract—Usenix Annual Technical Conference, 1998. http://www.usenix.org/publications.

Santos, Jonathan et al., "Increasing Effective Link Bandwidth by Suppressing Replicated Data," USENIX Annual Technical Conference (No. 98), Jun. 1998.

Tridgall, Andrew et al., "The rsync algorithm," The Australian National University, Jun. 1996.

* cited by examiner

Primary Examiner—Jungwon Chang

(57) ABSTRACT

A system and method for comparing a digest value in an incoming response to a digest index (e.g., a hash table). The digest index includes digest values of data objects already cached at a cache. Data object retrieval is avoided when a match is found between the digest value and a digest value in the digest index.

20 Claims, 6 Drawing Sheets

REDUCTION OF NETWORK RETRIEVAL LATENCY USING CACHE AND DIGEST

FIELD OF THE INVENTION

The present invention relates to a system and method for reducing network retrieval latency. In particular, this invention relates to a system and method for reducing network retrieval latency using cache and digest.

BACKGROUND OF THE INVENTION

Users of the Internet and other network information retrieval systems sometimes suffer from excessive latency (or response time). That is, the time between making a request for information and the time that the requested information is finally delivered is often longer than desired. For a user of a Web browser, for example, such latency may require the user to wait for seconds, or even minutes, while the requested information (e.g., text, images, audio, or applications) is loaded. A typical Web page retrievable from the Internet contains several embedded images. Thus, the latency for presenting an entire page may be the sum of the latencies for numerous retrievals (e.g., the HTML file and several GIF or JPEG images).

The excessive latency problem is especially significant for slower network connections (e.g., dial-up via modem or wide-area wireless connections) and for heavily congested networks because congestion tends to increase transmission time and therefore reduce effective bandwidth.

There are several prior approaches to achieve latency reduction on the Internet and other networked systems. In one approach, data objects are cached at an ultimate client or at an intermediate (proxy) cache for subsequent re-use. Caching is not useful, however, if a requested data object is not already present in the cache, which happens more often than not.

In another approach, compression algorithms are used to compress the representation of data objects before transmission. Such compressed data objects are then decompressed without loss upon reception. In general, most image and audio formats on the Internet are already compressed.

In yet another approach, distillation algorithms are used to remove certain contents from requested data objects, so as to make the requested data objects transmissible in fewer bytes (e.g., converting a 400×400 pixel image to a 200×200 pixel image). Unlike compression, however, distillation is irreversible and may degrade the resulting data object or render it useless.

In yet another approach, prediction, by various means, is performed to automatically request in advance data objects that may be requested in the future. Unless the prediction algorithm is perfect, however, this approach is liable to result in false pre-fetches and hence wasted bandwidth, which can itself increase latency.

In another approach (a so-called delta encoding mechanism), when a modified data object is very similar to a previous instance already held in a cache, the sender can transmit the differences between the two instances, rather than the entire new instance. This approach saves significant amounts of transmission time in some cases, but not in the majority of cases.

Frequently, data objects on the Internet or other networked systems appear in multiple exact copies, but with different names. For example, the same Compaq logo image might appear under different URLs at different servers. Because the URL for each such data object is different, traditional caches do not recognize that a request for a data object at one URL is satisfiable by the same data object at another URL.

Thus, it is desirable to provide a system and method for reducing retrieval latency that overcome the problems associated with prior approaches.

SUMMARY OF THE INVENTION

A system and method for comparing a digest value in an incoming response to a digest index (e.g., a hash table). The digest index includes digest values of data objects already cached at a cache. Data object retrieval is avoided when a match is found between the digest value and a digest value in the digest index.

Digest values may be calculated using a cryptographic digest algorithm known in the art, such as MD5, SHA-1, Rabin Fingerprint, or any digest algorithm that is unlikely to generate the same digest value for two different data object. Further, in each incoming response message, a digest value for a responding data object is positioned before the data object itself. For example, the digest value is located in the header portion of an incoming response message.

In one embodiment, this system requires the collaboration between a sender and a receiver and an appropriate process executed at the client cache. For example, the client cache receives a request (from a client) for the data object at the URL: "http://example.com/x.gif." If the client cache determines that it does not have a cache entry for the URL "http://example.com/x.gif," it forwards the request to an HTTP server at example.com. The HTTP server processes the request and returns a response with a header portion having multiple header fields as follows:

HTTP/1.1 200 OK
Digest: md5=HUXZLQLMuI/KZ5KDcJPcOA==
Date: Sun, 16 May 1999 02:00:04 GMT
Content-type: image/gif All of the above header names have been previously defined in standards or public proposals for other purposes known in the art. The "Digest" header in this example indicates that the MD5 digest of the response data is equal to "HUXZLQLMuI/KZ5KDcJPcOA==." After receiving the header portion, the client cache parses the header fields in the header portion, extracts the digest, and searches a digest index to determine if any currently-cached data object has a matching MD5 digest. In an exemplary embodiment, a hash table is used as a digest index to facilitate fast look ups of digest value in the response header. If no such cached data object is found, the client cache continues its normal behavior and retrieves the rest of the current response. If such a data object is found, however, then the client cache sends the data object with the header portion to the client and avoids retrieving the rest of the current response (e.g., by aborting the connection with the server).

Thus, a significant retrieval latency reduction is achieved when the response data is large and/or when the incoming network connection is slow (i.e., the time between receiving the first response header and the final byte of the response data is relatively lengthy).

DETAILED DESCRIPTION OF PREFERRED EMBODIMENTS

Figure 1:
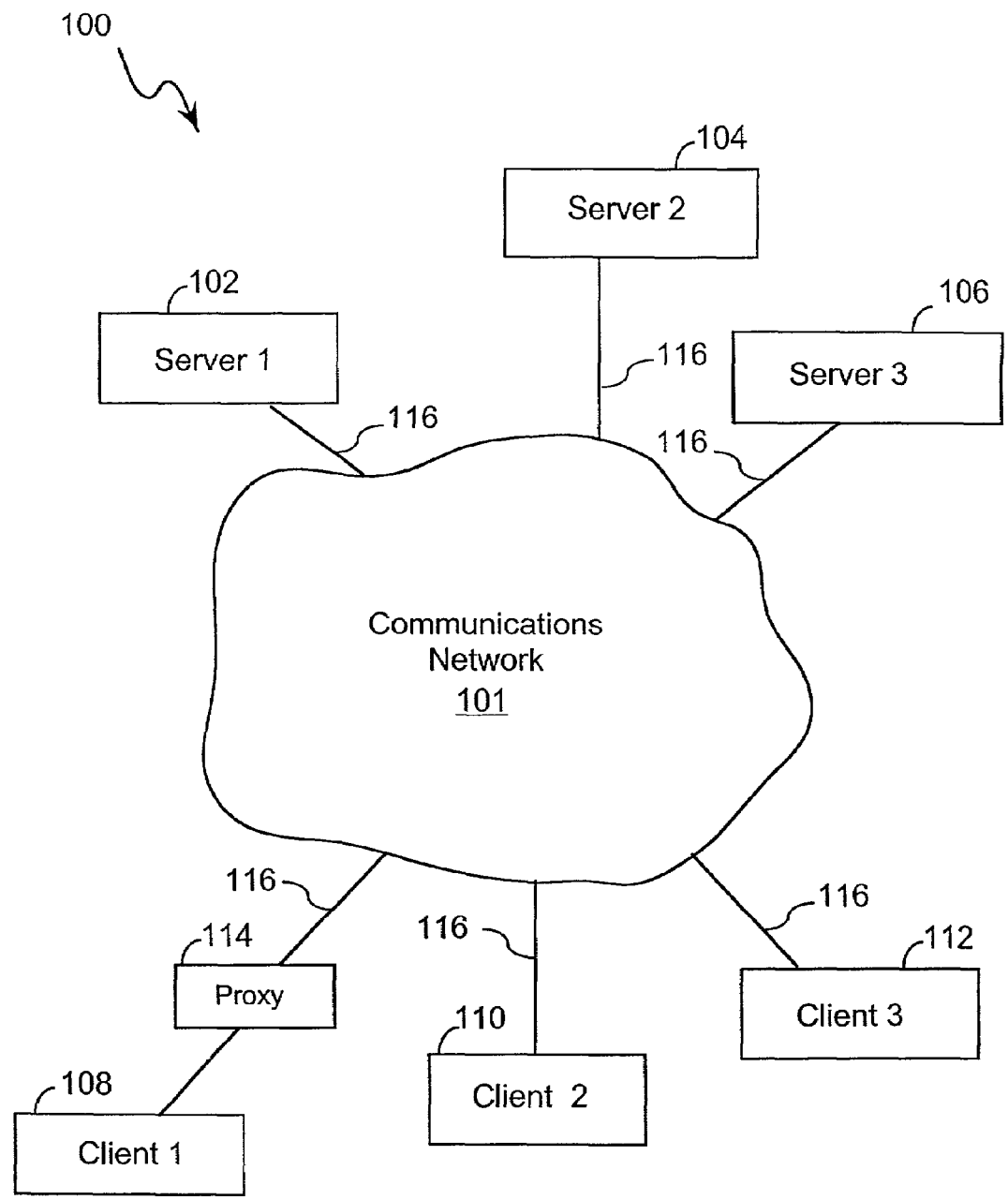
FIG. 1 illustrates an exemplary distributed system in accordance with an embodiment of the invention.

FIG. 1 illustrates an exemplary embodiment of a distributed system 100. The distributed system 100 includes multiple servers 102-106 and multiple clients 108-112 connected to a network 101 through network interconnections 116. In an exemplary embodiment, one or more clients, such as the client 108, may be connected to the network 101 via a proxy cache 114. The network 101 may be a global communication network, such as the Internet, or a private network, sometimes called an Intranet. Examples of network interconnections 116 include switches, routers, etc. For ease of explanation, only a representative number of servers, clients, and proxy cache are depicted in FIG. 1. A person skilled in the art would recognize that on a network, such as the Internet, many more servers, clients, and proxy caches can be interconnected.

Figure 2:
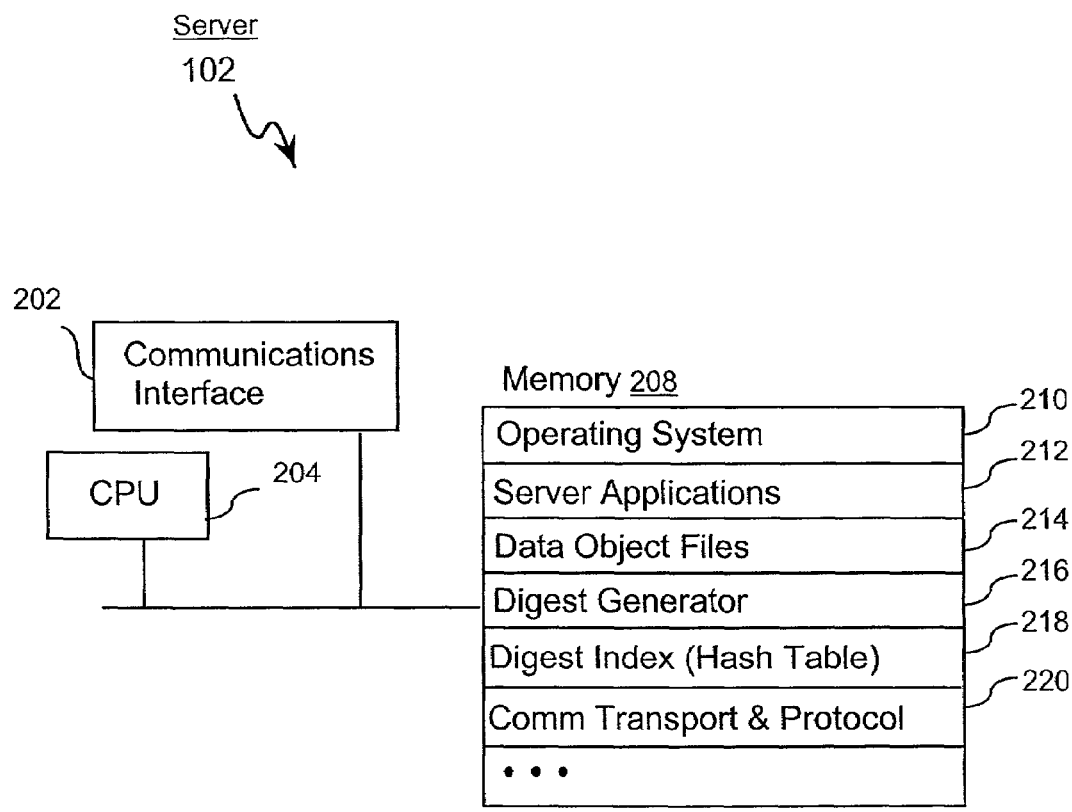
FIG. 2 illustrates an exemplary server in accordance with an embodiment of the invention.

FIG. 2 illustrates an exemplary server 102 in accordance with an embodiment of the invention. The server 102 includes a communications interface 202, a CPU 204, and memory 208. The memory 208 includes an operating system 210, server applications 212 for facilitating server functions, data object files 214 for storing various data objects available to clients connected to the network 101, a digest generator 216 for generating digest values for each data object in the data object files 214, a digest index 218 for storing a list of previously generated digest values, and a communications transport and protocol 220 for facilitating communications with the network 101. In an exemplary embodiment, the digest index 218 comprises a hash table, a tree structure, or other suitable data structure. In one embodiment (not shown), the server 102 does not include a digest index, and therefore calculates each digest value as needed.

Figure 3:
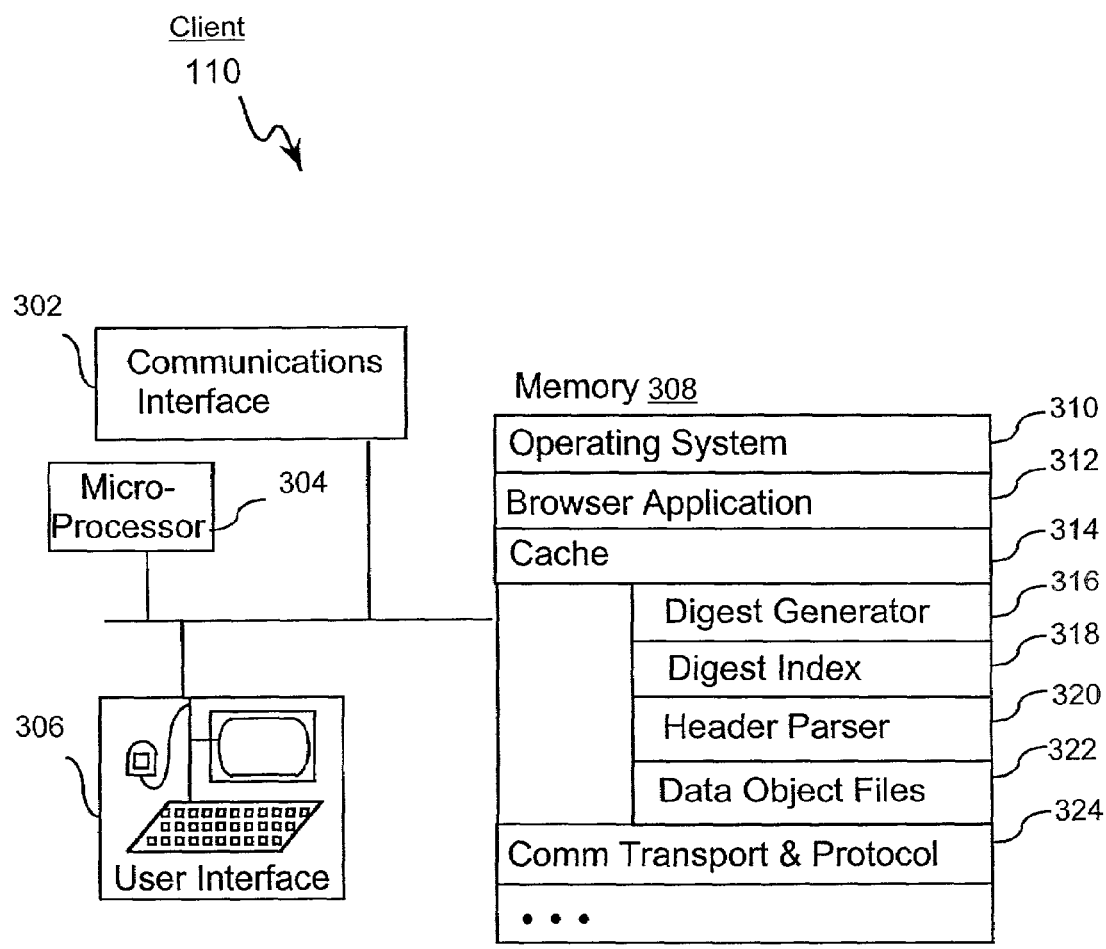
FIG. 3 illustrates an exemplary client in accordance with an embodiment of the invention.

FIG. 3 illustrates an exemplary client 110 in accordance with an embodiment of the invention. The client 110 includes a communications interface 302, a microprocessor 304, a user interface 306, and memory 308. In an exemplary embodiment, the memory 308 includes an operating system 310, a browser application 312 for facilitating browsing activities on the network 101, a cache 314, and a communications transport and protocol 324 for facilitating communications with the network 101. In another exemplary embodiment, the cache 314 is located in a separate computer system (not shown) and is connected to the client 110 via a network (not shown). The cache 314 includes a digest generator 316 for generating digest values for data objects cached at the cache 314, a digest index 318 (e.g., a hash table or a tree structure, etc.) for storing previously generated digest values, a header parser 320 for parsing headers of incoming responses from a server 102-106 or a proxy cache 114, and data object files 322 for caching data objects.

Figure 4:
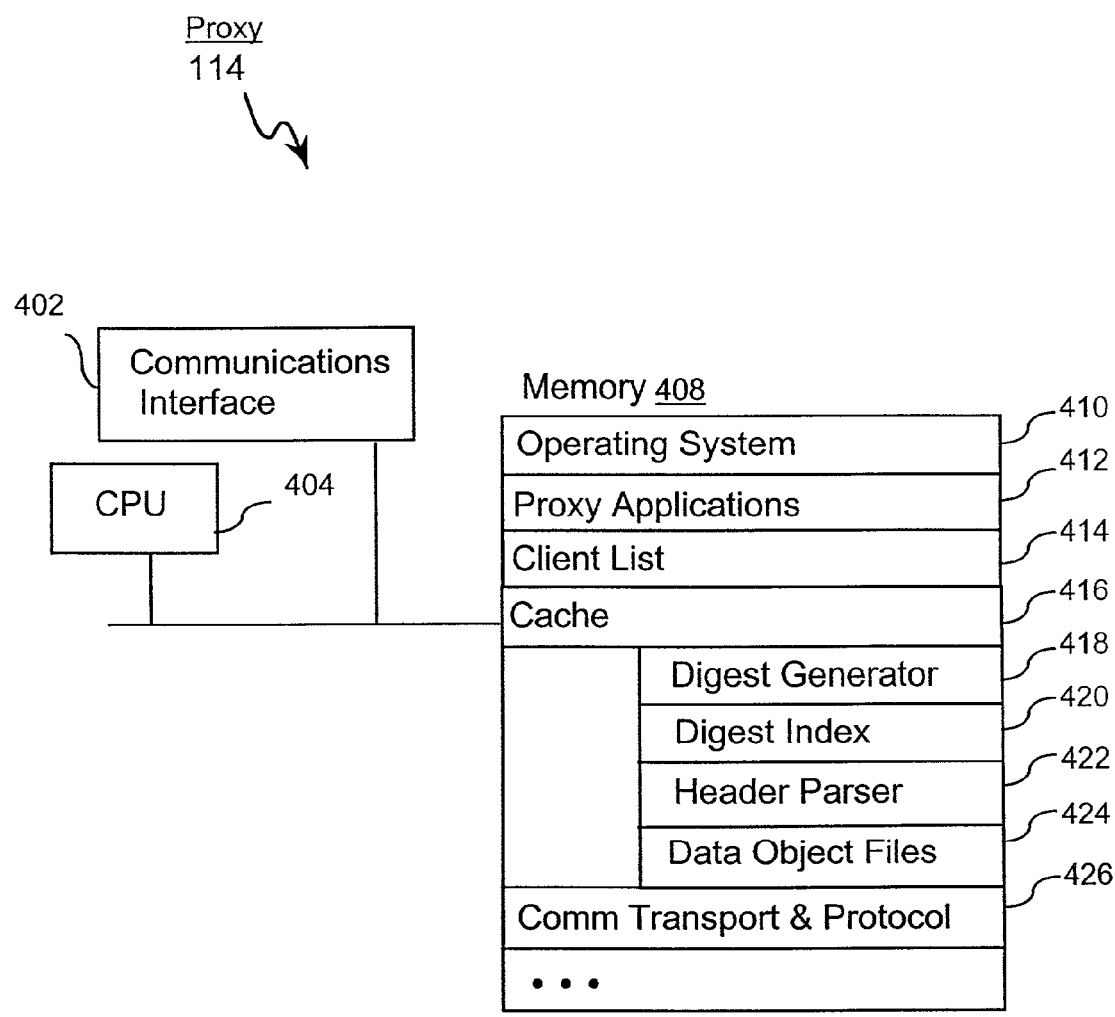
FIG. 4 illustrates an exemplary proxy cache in accordance with an embodiment of the invention.

FIG. 4 illustrates an exemplary proxy cache 114 in accordance with an embodiment of the invention. The proxy cache 114 includes a communications interface 402 for communicating with the network 101, a CPU 404, and memory 408. The memory 408 includes an operating system 410, proxy applications 412 for facilitating proxy functions, a client list 414 listing the clients serviced by the proxy cache 114, a cache 416, and a communications transport and protocol 426 for facilitating communications with the network 101. The cache 416 includes a digest generator 418 for generating digest values for data objects cached at the cache 416, a digest index 420 (e.g., a hash table or a tree structure) for storing previously generated digest values, a header parser 422 for parsing headers of incoming responses from a server 102-106, and data object files 424 for caching data objects.

Figure 5:
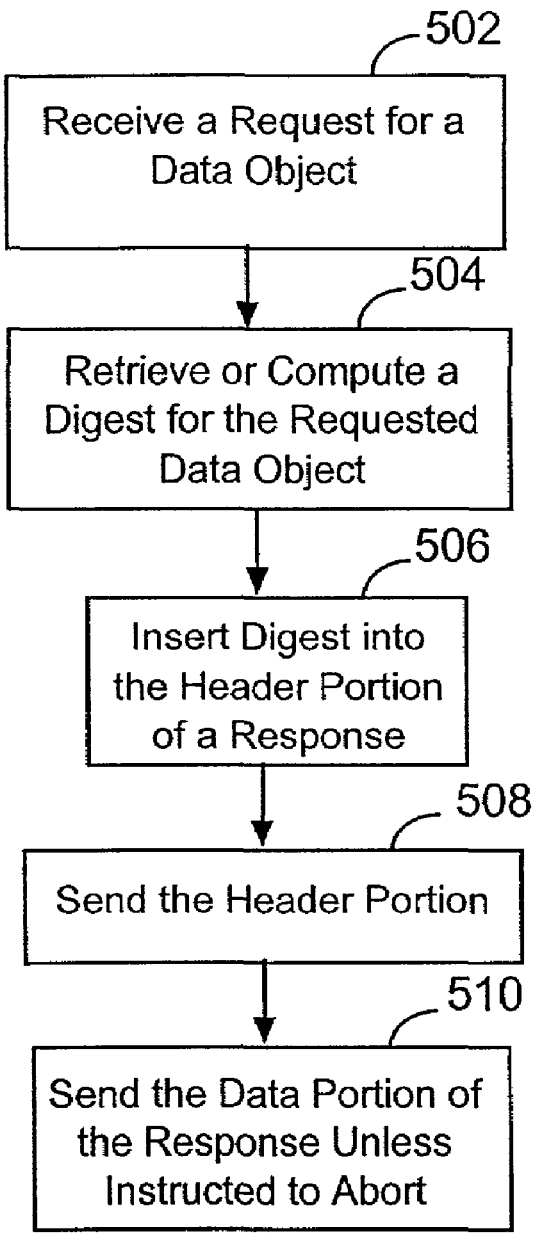
FIG. 5 is a flow chart illustrating an exemplary server process in accordance with an embodiment of the invention.

FIG. 5 illustrates an exemplary server process in accordance with an embodiment of the invention. At step 502, a server 102 receives a request for a data object. In one embodiment, the request is sent from a client 108 via the proxy cache 114. In another embodiment, the request is sent from a client 110 directly to the server 102. Upon receipt of the request, the server 102 either retrieves a previously calculated digest value associated with the requested data object from the digest index 218 or calculates a digest value (e.g., where the digest value is not in the digest index 218) using the digest generator 216 (step 504). Next, the server 102 inserts the retrieved or calculated digest value into a header portion of a response to the request (506). In a preferred embodiment, the digest value is inserted as early as possible in the header portion. Typically, a response includes a header portion and a data portion. Further, the header portion generally includes multiple header fields. The header portion is sent to the client either via a proxy cache 114 or directly (step 508). The data portion of the response is sent next unless and until the server 102 receives an instruction to abort transmission either from the client or the proxy cache 114 (step 510).

Figure 6:
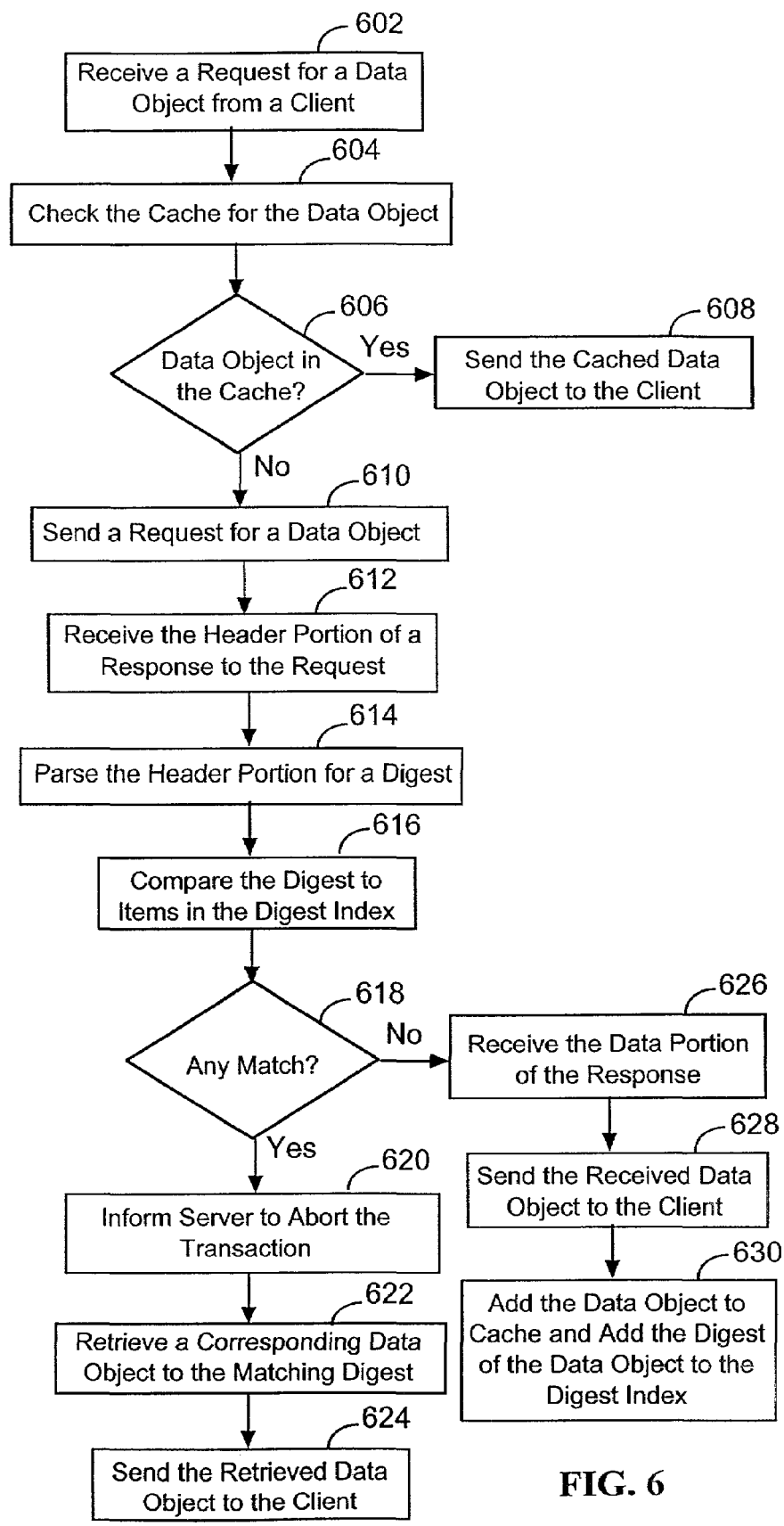
FIG. 6 is a flow chart illustrating an exemplary cache process in accordance with an embodiment of the invention.

FIG. 6 illustrates an exemplary process performed by the client cache 314 or the proxy cache 114. At step 602, a request for a data object is received from the client. In the following discussion, the "client" is a client device or computer when the process is performed by a proxy cache 114. When the process is performed by a client cache 314, the "client" is a client program, such as the browser application 312 (see FIG. 3). Next, the cache (314 or 114) checks the data object files (322 or 424) to determine whether the requested data object is already cached and not expired (step 604). If the requested data object is already cached (step 606), that data object is sent to the client as the response to the request (step 608). If the requested data object is not cached (step 606), a request for a data object is sent to a server 102 (step 610). Next, a header portion of a server response is received from the server 102 (step 612). The header portion of the response is parsed for a digest value of the requested data object (step 614). The digest value obtained is compared to the digest index (318 or 420) for a matching digest value (step 616). If a match is found (step 618), the server 102 is informed to abort the transaction so that the data portion of the response is not sent (step 620). Next, a cached data object corresponding to the matching digest value is retrieved from the data object files (322 or 424) (step 622). The retrieved data object is sent to the client (step 624). In an exemplary embodiment, steps 620 and 622 can be performed simultaneously or in a reverse sequence. Retrieval latency for retrieving the requested data object is reduced by supplying the client with an identical data object that was already cached in a cache at the client cache 314 or the proxy cache 114.

In a request-per-connection model, such as originally used in HTTP, the cache (314 or 114) can simply close the transport connection (e.g., the TCP connection) to stop data transmission. Recent improvements to HTTP include a "persistent connection" model, which allows several requests to be sent over the same connection to generally improve performance. In the persistent connection model, when a connection is closed, all other pending requests made during the connection are also terminated and may need to be resent later. In some cases, it may be beneficial overall to close the connection to stop transmission even if other pending requests will have to be resent (e.g., when the data object being transmitted is large). In a preferred embodiment, the server is requested to only stop sending a specific response without closing the connection and without preventing the transmission of responses to other requests. This feature could be implemented in a future version of HTTP, especially in proposed future versions that include a multiplexing mechanism. Mechanisms for prematurely terminating a data exchange without closing the transport connection are well-known in art.

Referring back to step 618, if there is no matching digest value in the digest index (318 or 420), the data portion of the response is received (step 626) and the received data portion (or data object) is sent to the client (step 628). Also, the received data object is typically added to the cache (314 or 114) and its digest value is added to the digest index (318 or 420) (step 630).

In an exemplary embodiment, the server 102 is configured to add digest values to the header portion of a response and to send the header portion of a response first before sending the data portion of the response. In another exemplary embodiment, some servers 102 are not configured to send digest values in the header portion, but either send the digest value out of order or do not send it at all. In this embodiment, upon receiving a server response that includes a requested data object but does not include a digest value in the header portion, the proxy cache 114 calculates the digest value of the requested data object and sends the digest value in a header portion of a proxy response to the client cache 314. When the client cache 314 receives the header portion from the proxy cache 114, it parses the header portion for any digest value. If a digest value is found in the header portion, the client cache 314 then compares that digest value to the digest index 318 for any matching digest values. If a match is found, then a previously cached data object is sent to the client 110. This way, a reduction of the potential retrieval latency is achieved because the client does not have to wait for the data portion of the response to be delivered from the proxy cache 114.

Digest value calculations are not prohibitively expensive. For example, a 90 MHz Pentium can compute MD5 digests at 191 Mbits/sec, which is a much faster speed than most current network links. Typically, home users (clients) on dialup, ISDN, or DSL lines comprise the slowest paths in the network 110. When the digest value is provided by the proxy cache 114 to the client cache 314 connected via a relatively slow link, the proxy cache 114 provides the client cache 314 an advance notification that the requested data object may be already cached. Thus, the client cache 314 is capable of using this information to provide the requested data object before the response to the request is completely delivered and possibly abort the delivery.

Cache management is achieved by mechanisms known in the art, such as the least-recently-used mechanism. A summary regarding available cache management mechanisms can be found in the article entitled "*Squeezing More Bits Out of HTTP Caches*," Jeffrey C. Mogul, May/June 2000 I.E.E.E. Network 14(3):6-14. This article is hereby incorporated by reference for all purposes.

The foregoing examples illustrate certain exemplary embodiments of the invention from which other embodiments, variations and modifications will be apparent to those skilled in the art. The invention should therefore not be limited to the particular exemplary embodiments discussed herein, but rather defined by the claims appended hereto.

What is claimed is:

1. A method for reducing network retrieval latency, comprising the steps of:
   sending a request for a data object to a server;
   receiving a header portion of a response to said request;
   parsing said header portion for a digest value;
   comparing said digest value to a digest index;
   retrieving a cached data object from a cache if said digest value has a match in said digest index;
   sending said cached data object to a client; and
   informing said server to stop sending a remaining portion of said response.

2. The method of claim 1, further comprising the steps of:
   checking said cache for said data object before sending said request to said server; and
   sending said data object to said client if said data object is found in said cache.

3. The method of claim 1, wherein said digest index is a hash table.

4. The method of claim 1, further comprising the steps of:
   receiving said remaining portion of said response from said server if no match for said digest value is found in said digest index based on said comparing step; and
   sending said remaining portion of said response to said client.

5. The method of claim 1, wherein said informing includes the step of:
   instructing said server to terminate a connection.

6. The method of claim 1 wherein said informing comprises:
   responsive to determining said digest value has a match in said digest index, performing said informing.

7. A method for reducing network retrieval latency, comprising the steps of:
   sending a request for a data object to a server;
   receiving a server response from said server;
   calculating a digest value for said data object based on said server response;
   sending a response to a client cache starting with a header portion, said header portion including said digest value and enabling said client cache to compare said digest value to a digest index, retrieve a cached data object from said client cache if said digest value has a match in said digest index, and send said cached data object to a client; and
   upon receiving a message from said client cache to stop sending said response, stopping the sending of said response.

8. A method for reducing network retrieval latency, comprising the steps of:
   receiving a first request for a data object;
   obtaining a digest value of said requested data object;
   inserting said digest value into a header portion of a response;
   sending said response, starting with said header portion; and
   upon receiving a second request to stop sending said response, stopping the sending of said response.

9. The method of claim 8, wherein said obtaining includes the step of:

retrieving said digest value from a hash table.

10. The method of claim 8, wherein said obtaining includes the step of:

calculating said digest value based on contents of said data object.

11. A computer program product for use in conjunction with a computer system for reducing network retrieval latency, comprising:

logic code for sending a request for a data object to a server;

logic code for receiving a header portion of a response to said request;

logic code for parsing said header portion for a digest value;

logic code for comparing said digest value to a digest index;

logic code for retrieving a cached data object from a cache if said digest value has a match in said digest index;

logic code for sending said cached data object to a client; and logic code for informing said server to stop sending a remaining portion of said response.

12. The computer program product of claim 11, further comprising:

logic code for checking said cache for said data object before sending said request to said server; and logic code for sending said data object to said client if said data object is found in said cache.

13. The computer program product of claim 11, wherein said digest index is a hash table.

14. The computer program product of claim 11, further comprising:

logic code for receiving said remaining portion of said response from said server if no match for said digest value is found in said digest index based on said comparing; and logic code for sending said remaining portion of said response to said client.

15. The computer program product of claim 11, wherein said logic code for informing includes:

logic code for instructing said server to terminate a connection.

16. The computer program product of claim 11, wherein said logic code for informing said server to stop sending a remaining portion of said response comprises:

logic code for performing said informing responsive to said logic code for comparing determining that said received digest value has a match in said digest index.

17. A computer program product for reducing network retrieval latency, comprising:

logic code for sending a request for a data object to a server;

logic code for receiving a server response from said server;

logic code for calculating a digest value for said data object based on said server response;

logic code for sending a response to a client cache starting with a header portion, said header portion including said digest value and enabling said client cache to compare said digest value to a digest index, retrieve a cached data object from said client cache if said digest value has a match in said digest index, and send said cached data object to a client; and logic code for stopping the send of said response upon receiving a message from said client cache to stop sending said response.

18. A computer program product for reducing network retrieval latency, comprising:

logic code for receiving a first request for a data object;

logic code for obtaining a digest value of said requested data object;

logic code for inserting said digest value into a header portion of a response;

logic code for sending said response, starting with said header portion; and logic code for stopping the sending of said response upon receiving a second request to stop sending said response.

19. The computer program product of claim 18, wherein said logic code for obtaining includes:

logic code for retrieving said digest value from a hash table.

20. The computer program product of claim 18, wherein said logic code for obtaining includes:

logic code for calculating said digest value based on contents of said data object.

* * * * *